(12) United States Patent
Kumon

(10) Patent No.: US 8,049,722 B2
(45) Date of Patent: Nov. 1, 2011

(54) VEHICULAR OPERATING APPARATUS

(75) Inventor: Hitoshi Kumon, Aichi-gun (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 894 days.

(21) Appl. No.: 12/065,811

(22) PCT Filed: Sep. 4, 2006

(86) PCT No.: PCT/IB2006/002442
§ 371 (c)(1),
(2), (4) Date: Mar. 5, 2008

(87) PCT Pub. No.: WO2007/029095
PCT Pub. Date: Mar. 15, 2007

(65) Prior Publication Data
US 2008/0211832 A1    Sep. 4, 2008

(30) Foreign Application Priority Data
Sep. 5, 2005 (JP) .................................. 2005-256926

(51) Int. Cl.
*G09G 3/033* (2006.01)
(52) U.S. Cl. .......................... 345/158; 345/157; 345/156
(58) Field of Classification Search .............. 345/7, 156, 345/150; 382/104
See application file for complete search history.

(56) References Cited

U.S. PATENT DOCUMENTS
2002/0041260 A1 * 4/2002 Grassmann ........................ 345/7
2004/0141634 A1 * 7/2004 Yamamoto et al. ............ 382/104
2005/0063564 A1 * 3/2005 Yamamoto et al. ............ 382/104

FOREIGN PATENT DOCUMENTS

| DE | 196 05 427 | 8/1997 |
|---|---|---|
| DE | 100 39 432 | 12/2001 |
| JP | 3-46724 | 2/1991 |
| JP | 5-150925 | 6/1993 |
| JP | 6-274270 | 9/1994 |
| JP | 7-64709 | 3/1995 |
| JP | 9-190278 | 7/1997 |
| JP | 10-207620 | 8/1998 |
| JP | 10 236243 | 9/1998 |
| JP | 10 269012 | 10/1998 |
| JP | 10-333094 | 12/1998 |
| JP | 11-15401 | 1/1999 |
| JP | 2000 6687 | 1/2000 |
| JP | 2000-66784 | 3/2000 |
| JP | 2000-75991 | 3/2000 |
| JP | 2000 335330 | 12/2000 |
| JP | 2001-174268 | 6/2001 |

(Continued)

*Primary Examiner* — Quan-Zhen Wang
*Assistant Examiner* — Troy Dalrymple
(74) *Attorney, Agent, or Firm* — Oblon, Spivak, McClelland, Maier & Neustadt, L.L.P.

(57) ABSTRACT

A vehicular operating apparatus in which an operating portion on which operating switches are arranged is arranged in a vehicle cabin in a separate location that is physically distanced from a display portion that displays an operation menu image showing the positional arrangement and function of the operating switch of the operating portion. An imaging mechanism captures an image of a hand of a user that operates the operating portion, a combining and displaying mechanism combines the captured image of the hand with the operation menu image and displaying the combined image on the display portion, and a light emitting portion illuminates the operating portion.

17 Claims, 13 Drawing Sheets

FOREIGN PATENT DOCUMENTS

| | | | | |
|---|---|---|---|---|
| JP | 2001-216069 | | | 8/2001 |
| JP | 2001216069 | A | * | 8/2001 |
| JP | 2001-282428 | | | 10/2001 |
| JP | 2002-132487 | | | 5/2002 |
| JP | 2003-5912 | | | 1/2003 |
| JP | 2003-104122 | | | 4/2003 |
| JP | 2003-248434 | | | 9/2003 |
| JP | 2004-12626 | | | 1/2004 |
| JP | 2004 26046 | | | 1/2004 |
| JP | 2004-26078 | | | 1/2004 |
| JP | 2004026046 | A | * | 1/2004 |
| JP | 2004-198971 | | | 7/2004 |
| JP | 2004-213038 | | | 7/2004 |
| JP | 2004213038 | A | * | 7/2004 |
| JP | 2004-258714 | | | 9/2004 |
| JP | 2004 325324 | | | 11/2004 |
| JP | 2004-334590 | | | 11/2004 |
| JP | 2004-341388 | | | 12/2004 |
| JP | 2005-141102 | | | 6/2005 |
| JP | 2005-189323 | | | 7/2005 |
| JP | 2005-196530 | | | 7/2005 |
| JP | 2005-254851 | | | 9/2005 |

\* cited by examiner

F I G . 11
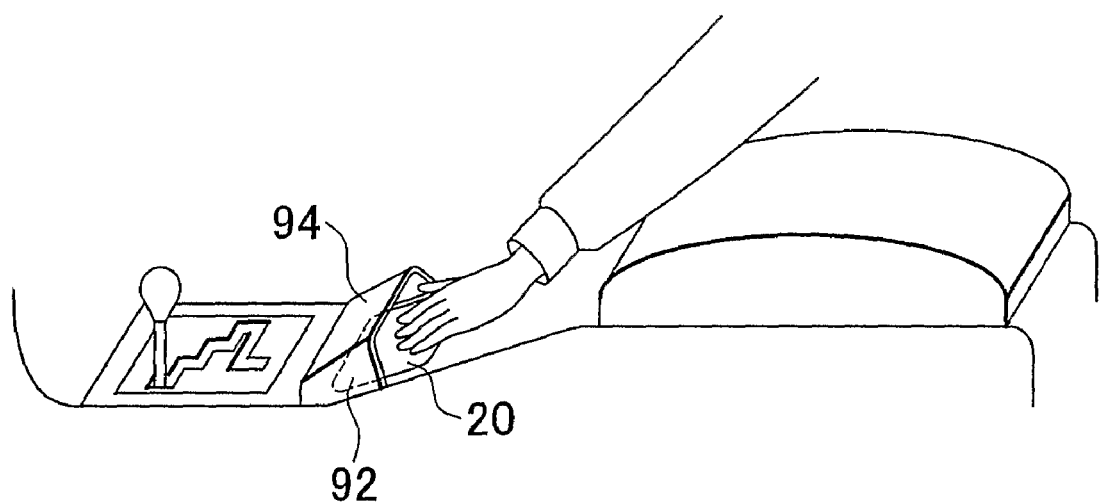

VEHICULAR OPERATING APPARATUS

BACKGROUND OF THE INVENTION

1. Field of the Invention

The invention relates to a vehicular operating apparatus in which an operating portion on which operating switches are arranged is arranged in a vehicle cabin in a separate location that is physically distanced from a display portion that displays an operation menu image showing the positional arrangement and function of the operating switch of the operating portion.

2. Description of the Related Art

Japanese Patent Application Publication No. JP-A-2000-6687, for example, discloses a related on-board equipment switch safety operating system which includes a multi-functional switch operating plate arranged in a preferable position in a vehicle, in which a plurality of various switches for operating various on-board equipment are arranged together, a display which is arranged in a preferable position in the vehicle within an operators forward field of view and displays an image of the arrangement of the plurality of switches, and a controller which, when the operator operates a given switch with a fingertip, performs control to notify the operator of the positional arrangement and function in the image of the given switch shown on the display based on a detection signal that is output when operation of the given switch is detected. This operating system is structured such that the given switch on the multi-functional switch operating plate can be operated in real time by a fingertip while the operator visually confirms the image of the given switch displayed on the display while looking ahead.

Also, another related on-board switch operating apparatus, which is operated by the driver and controls electronic equipment in a vehicle, includes a switch array which can be arranged in a position near the driver's seat, thus allowing easy operation by the driver, and in which a plurality of switches are arranged; a camera which can be arranged near the driver's seat and which consecutively captures images of the switch array and switch operations by the driver; an indicator image data storing portion which stores indicator image data for indicating near each switch the function of that switch on the image captured by the camera; an image combining portion which combines the images of the indicating image data in the indicator image data storing portion with the image data of the captured image; a display portion which can be arranged in or near a front panel and displays the combined image; and a control portion which receives a switch operating signal and outputs a control signal for performing control corresponding to the function indicated on the image of the switch (for example, Japanese Patent Application Publication No. JP-A-2000-335330; similar technology is also disclosed in Japanese Patent Application Publication No. JP-A-10-269012 and Japanese Patent Application Publication No. JP-A-2004-26046).

Also, Japanese Patent Application Publication No. JP-A-10-236243 discloses a blind touch controller for specifying a menu for vehicle information shown on a display, which has switch operating means for specifying the vehicle information menu. Human detecting means is provided on the switch operating means. When an operating finger is extended to operate the switch operating means, this human detecting means detects an object approaching an access area in a range a predetermined distance from the switch operating means, recognizes that the detected object is the operating finger, and generates an access signal.

In the various vehicular operating apparatuses described above, the operating portion can be arranged in a position that is physically distanced from the display portion by using a camera to capture an image of the hand of the user which is operating the operating portion and showing that image superimposed on the display portion that shows the operation menu image. These apparatuses are thus useful because they make so-called blind operations of on-board equipment easy.

However, because the operating portion is mounted in a vehicle, it is inevitably exposed to an environment in which sunlight will shine onto it. When sunlight enters the operating portion, it may cause the color (saturation) and brightness of the operating portion in the image to change or cause shadows from objects to be cast onto the operating portion. As a result, the contrast difference or the color (saturation) difference between the image of the portion of the hand and the image of the portion other than the hand in the image (i.e., the image of the operating portion) tend to decrease, making it difficult or impossible to accurately extract the image of the portion of the hand from the image captured by the camera. Also, in an environment in which there is insufficient lighting such as at night, it is conversely necessary to light up the operating portion using cabin interior lighting or the like. In this case as well, attempting to provide sufficient lighting may bother the user, as well as result in shadows, for example, being cast on the operating portion just as in the case with sunlight, thus making it difficult or impossible to extract the image of the hand.

SUMMARY OF THE INVENTION

The object of this invention is thus to enable the various vehicular operating apparatuses described above to be able to extract an image of a hand from an image captured by capturing means even in an environment which is unavoidable due to the capturing means being mounted in a vehicle.

In order to achieve this object, a first aspect of the invention relates to a vehicular operating apparatus in which an operating portion on which operating switches are arranged may be arranged in a vehicle cabin in a separate location that is physically distanced from a display portion that displays an operation menu image showing the positional arrangement and function of the operating switches of the operating portion, which is characterized by including imaging means for capturing an image of a hand of a user which operates the operating portion; combining and displaying means for combining the captured image of the hand with the operation menu image and displaying the combined image on the display portion; and light emitting means for illuminating the operating portion.

According to a second aspect, in the vehicular operating apparatus according to the first aspect, the combining and displaying means may use chroma key combining technology, and the light emitting means may use illuminate the operating portion in a key color.

According to a third aspect, in the vehicular operating apparatus according to the first or second aspect, the light emitting means may adjust the luminance of the emitted light with at least the amount of sunlight as a parameter.

According to a fourth aspect, in the vehicular operating apparatus according to any one of the first to third aspects, shielding means for blocking sunlight from shining onto the operating portion may be provided in an area around the operating portion.

According to a fifth aspect, in the vehicular operating apparatus according to any one of the first to third aspects, the operating portion may be arranged within a concave space formed in an interior member of the vehicle.

According to a sixth aspect, in the vehicular operating apparatus according to the fifth aspect, the imaging means may be arranged within the concave space.

According to a seventh aspect, in the vehicular operating apparatus according to the first aspect, the combining and displaying means may perform the combining and displaying by converting the image of the hand to a graphic image of a hand, combining the graphic image of the hand with the operation menu image and displaying the combined image on the display portion.

According to an eighth aspect, in the vehicular operating apparatus according to the seventh aspect, an outline of the hand in the graphic image of the hand may be generated based on a silhouette of the hand that is extracted based on the image of the hand, and the outline may be generated such that the region of the hand that is surrounded by the outline is smaller than the same region that is surrounded by the silhouette of the extracted hand so that the hand appears smaller than it actually is.

According to a ninth aspect, in the vehicular operating apparatus according to any one of the first to eighth aspects, the combining and displaying means becomes operable when the hand of the user is detected near or touching the operating portion.

According to a tenth aspect, in the vehicular operating apparatus according to any one of the first to eighth aspects, the light emitting means may illuminate the operating portion while gradually increasing the luminance of the emitted light when the hand of the user is detected near or touching the operating portion.

According to an eleventh aspect, in the vehicular operating apparatus according to the ninth aspect, proximity/contact detecting means for detecting the proximity of or contact (i.e., touching) by the hand of the user may be provided in an area near the operating portion.

According to a twelfth aspect, in the vehicular operating apparatus according to the tenth aspect, proximity/contact detecting means for detecting the proximity of or contact (i.e., touching) by the hand of the user may be provided in an area near the operating portion on which the hand is placed when operating the operating portion.

The effect of the above aspects is that it enables an image of a hand to be extracted from an image captured by capturing means even in an environment which is unavoidable due to the capturing means being mounted in a vehicle, by providing light emitting means for illuminating an operating portion.

BRIEF DESCRIPTION OF THE DRAWINGS

The foregoing and further objects, features and advantages of some aspects of the invention will become apparent from the following description of preferred embodiments with reference to the accompanying drawings, wherein like numerals are used to represent like elements and wherein:

FIG. 11 is a perspective view of a vehicular operating apparatus according to another example embodiment;

DETAILED DESCRIPTION OF THE PREFERRED EMBODIMENTS

Figure 1:
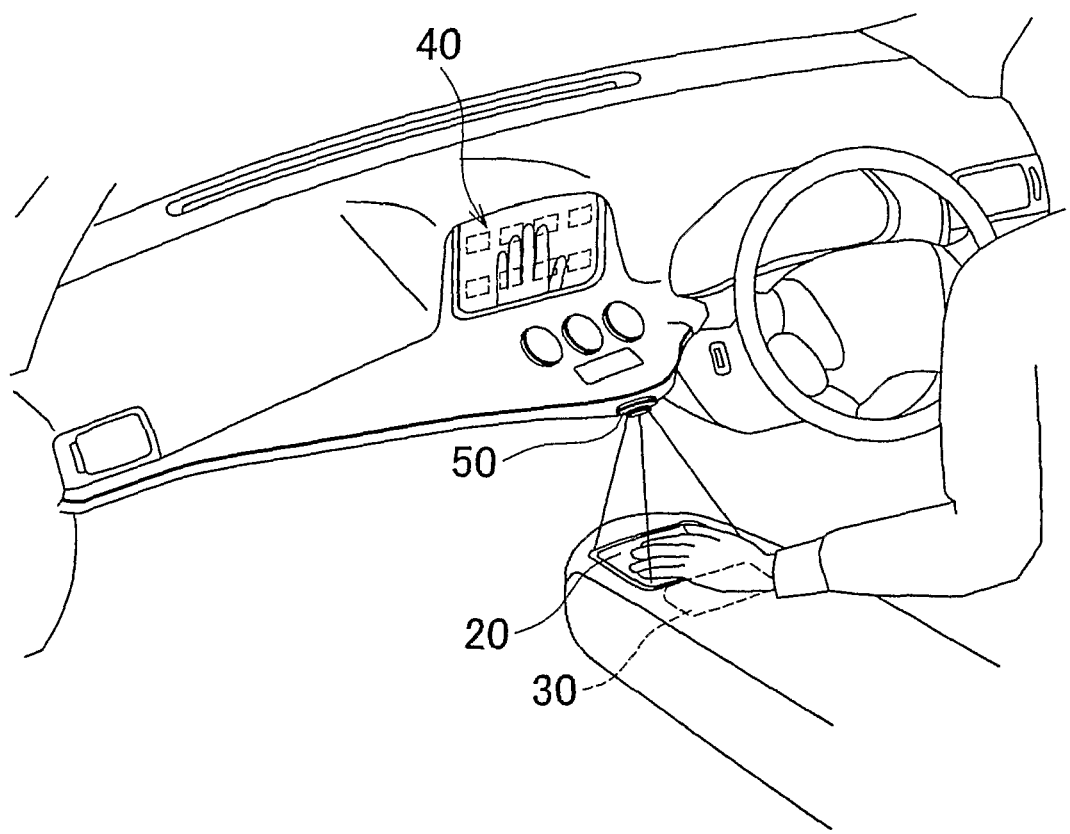
FIG. 1 is a perspective view of an in-vehicle arrangement of a vehicular operating apparatus according to a first example embodiment of the invention.
Figure 2:
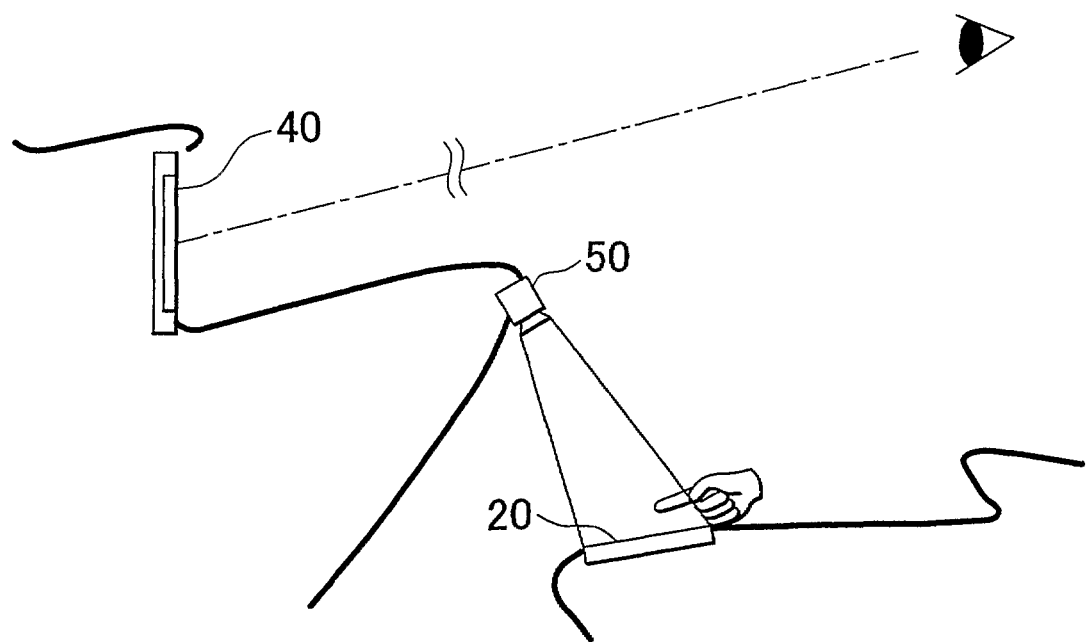
FIG. 2 is a sectional view schematically showing the vehicular operating apparatus shown in FIG. 1 as it appears from the side.
Figure 3:
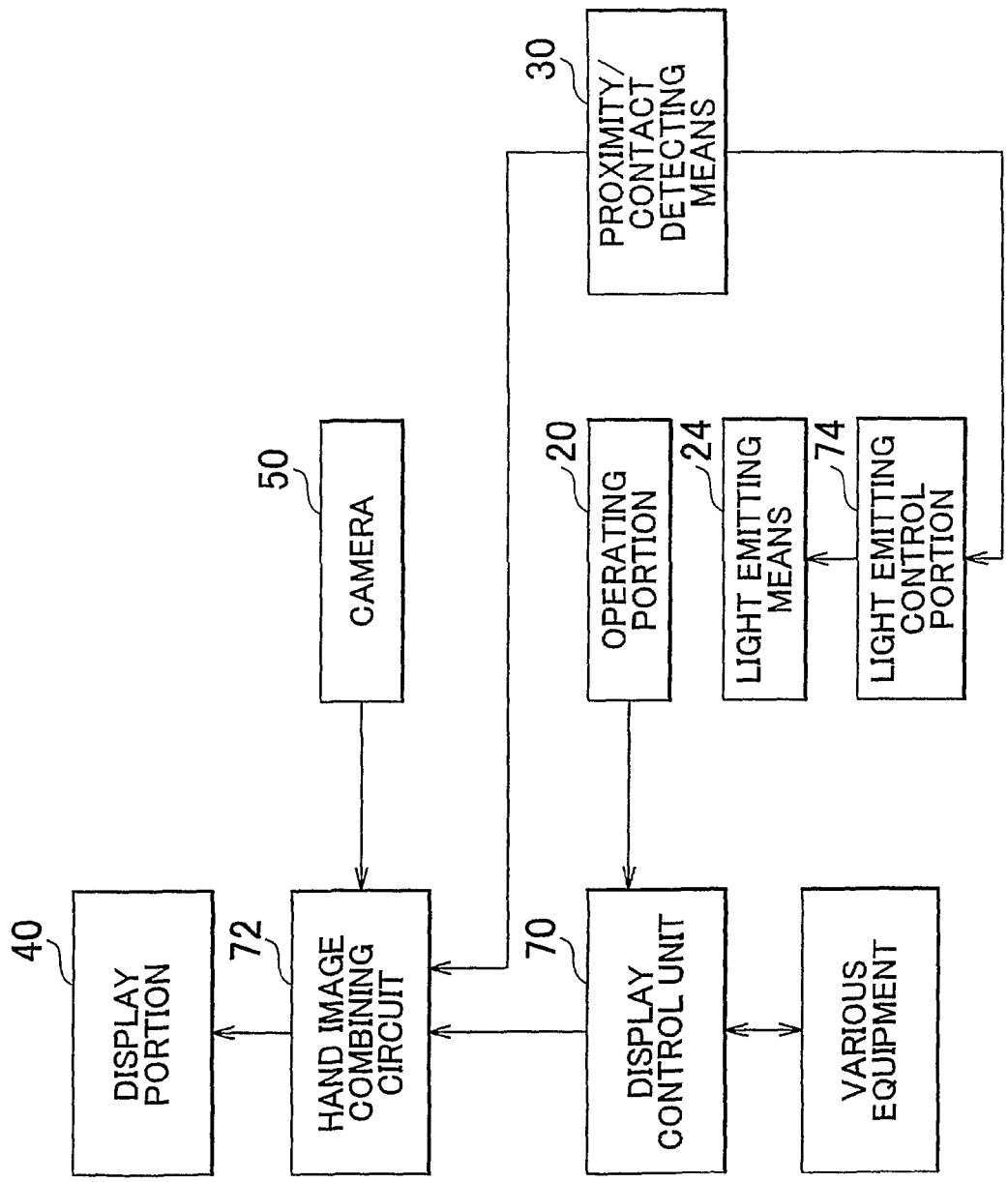
FIG. 3 is a functional block diagram of an in-vehicle system related to the vehicular operating apparatus.

FIG. 1 is a perspective view of an in-vehicle arrangement of a vehicular operating apparatus according to a first example embodiment the invention. FIG. 2 is a sectional view schematically showing the vehicular operating apparatus shown in FIG. 1 as it appears from the side. FIG. 3 is a functional block diagram of an in-vehicle system related to the vehicular operating apparatus. As shown in FIG. 1, the vehicular operating apparatus according to this example embodiment includes an operating portion 20, a display portion 40, and a camera 50, with the operating portion 20 and the display portion 40 arranged in physically separate locations in the vehicle cabin.

The operating portion 20 may be, for example, a touch panel on which a plurality of operating switches are arranged, and is arranged in a position that enables it to be easily operated by a user, preferably in a position in which a driver can operate it by simply extending his or her hand. For example, the operating portion 20 may be arranged in a center console portion, as shown in FIG. 1, or in an instrument panel. The operating portion 20 is arranged so that its generally flat operating portion is substantially horizontal.

The display portion 40 is formed with a liquid crystal display or the like and is arranged in a position that is easy for the user to see, preferably in a position in which the driver can see it without greatly changing his or her field of vision while driving. For example, the operating portion 40 may be arranged in a center portion of an upper surface of an instrument panel, as shown in FIG. 1, or in a meter.

The image output or picture output displayed by the display portion 40 is controlled by a display control unit 70 (see FIG. 3). This display control unit 70 may be part of a navigation system (i.e., including the imaging processor), for example, in which case map images and the like in addition to an operation menu image, which will be described later, are supplied to the display portion 40 and displayed.

Figure 4:
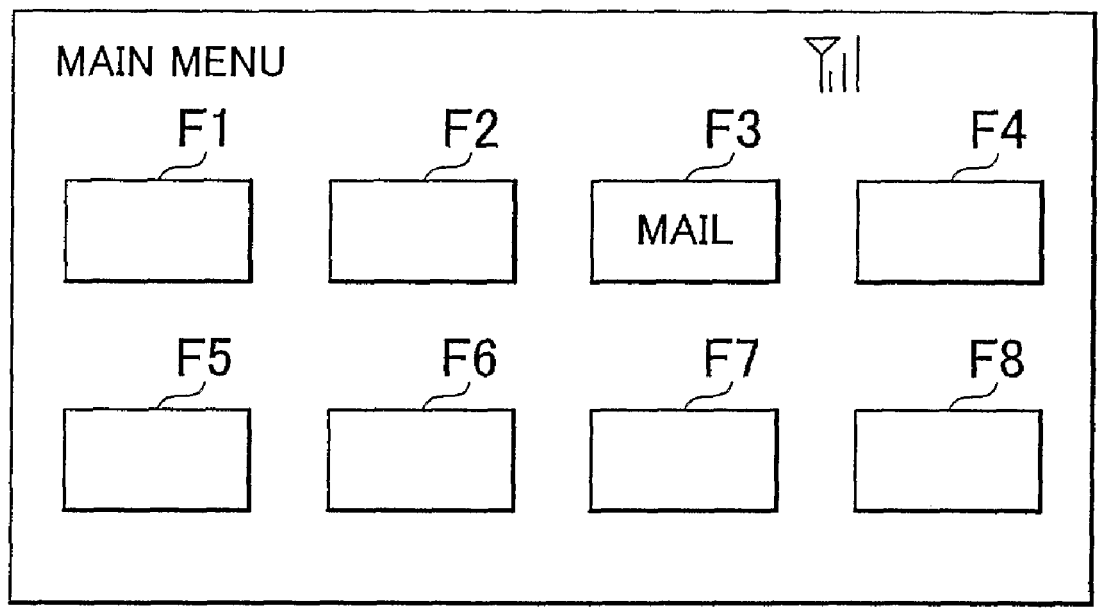
FIG. 4 is a view of one example of an operation menu image.

Under control of the display control unit 70, an operation menu image that aids the user in operating the operating portion 20 is displayed on the display portion 40, as shown in FIG. 4. The operation menu image shows the positional arrangement and function of operating switches of the operating portion 20. The operation menu image serves to inform the user of the various functions that are realized by operating the operating portion 20 and also shows the user the locations of the switches to be operated in order to realize each of those various functions.

In the example shown in FIG. 4, the operation menu image includes graphic images F1 to F8 simulating eight operating switches of the operating portion 20. When the user sees this display portion 40, he or she (hereinafter in this specification, the term "he" will be used to refer to both male and female for simplicity) knows that the operating switches of the operating portion 20 are arranged in two rows, one in back of the other. By seeing the characters in each of the graphic images F1 to F8, the user is able to know the function that can be realized by operating the various operating switches. For example, if the user wants to check E-mail, he is able to know that all he needs to do is push the operating switch that is in the location corresponding to the graphic image F3 that includes the characters for "mail", i.e., the third operating switch from the left in the front row of the operating portion 20.

Various operation menu images may be prepared and interchanged appropriately according to the operating state and the like of the operating portion 20. In this case, the positional arrangement and the function of the operating switches in the operating portion 20 change when the operation menu image changes. With this structure, operating switches for a host of on-board equipment can be realized in the operating portion 20, making it possible to efficiently consolidate the operating switches. For example, although not shown in FIG. 4, various operating switches for various operations of an air-conditioning system and an audio system may be realized in addition to operations of on-board equipment of an information communication system such as E-mail, phone, and nearby facility guidance and the like.

Figure 5:
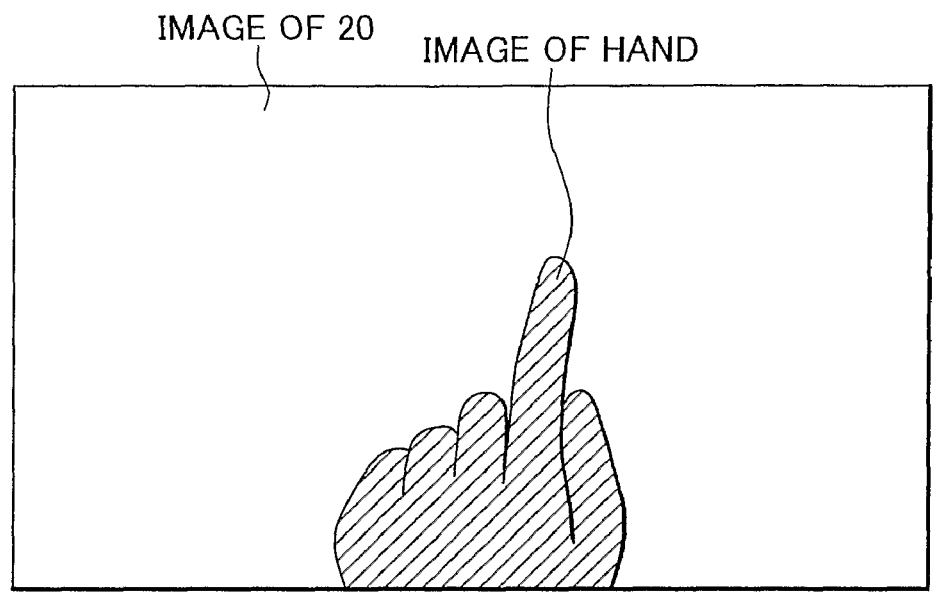
FIG. 5 is a view of a camera image which includes a hand image to be extracted.

The camera 50 (imaging means) is a small color camera in which a CCD or a CMOS, for example, is used as an imaging device. The camera 50 is arranged so that it can look down on the operating portion 20 (and the hand of the user that is operating it). That is, the focal point and position/angle relationship with the operating portion 20 and the like of the camera 50 are determined so that the camera 50 captures the entire operating portion 20. Accordingly, the entire image of the operating portion 20 is included in substantially the entire image captured by the camera 50 (hereinafter referred to as "camera image"). When the hand of the user enters the area captured by the camera 50 in order to operate the operating portion 20, an image of the hand is included in the camera image, as shown in FIG. 5. The camera image which includes the image of this hand is then provided to a hand image combining circuit 72 (see FIG. 3). In the hand image combining circuit 72, only the image of the hand (hereinafter referred to as "hand image") is extracted from the camera image, and that extracted hand image is combined with the operation menu image supplied by the display control unit 70 and displayed by the display portion 40. That is, the hand image is combined with the operation menu image and this combined image is then displayed on the display portion 40. Hereinafter, this operation menu image that includes the hand image, which is displayed on the display portion 40 in this manner, will simply be referred to as "combined image".

The extraction and combination of the hand image may be realized using the color (saturation) difference or contrast difference between the hand and portions other than the hand (i.e., the operating portion 20) that are included in the camera image. Chroma key combining technology, which is itself widely known, is typically used. Chroma key combining technology is technology which combines separate images by capturing an image having a background of a specific color (i.e., a key color) and superimposing another image onto that key color. Blue is typically used as the key color because provides the most contrast to the color of human skin, which makes it suitable for extracting a human hand from an image. Accordingly, the operating portion 20 is made in the key color (such as blue), which will be described later, so that when the blue portion in the camera image is keyed out (i.e., removed) by the chroma key, only the hand image remains. This hand image is then combined with the operation menu image (see FIG. 4) prepared as the background image. There are also other methods for extracting and combining the hand image, such as luminance combining technology (i.e., a method of specifying a particular luminance signal from among luminance signals (i.e., Luminance) that include contrast information and image luminance, and removing all signals equal to or less than, or equal to or greater than, that signal. Hereinafter, however, a case will be described in which mainly chroma key combining technology is used.

FIG. 7 shows a plurality of examples of combined images. The combining position of the hand image, i.e., the position in which the hand image is combined with the operation menu image, is determined so that the correlative positional relationship between the position of the hand in the hand image in the display portion 40 (i.e., based on a combined image) and each graphic image F1 to F8 accurately reproduce the correlative positional relationship between the actual position of the hand on the operating portion 20 and the position of each operating switch. This combining position may be computed based on the correlative relationship between a coordinate system of the camera image and a coordinate system of the operation menu image (i.e., the coordinate conversion method). Any error or the like in the on-board position of the camera 50 may be appropriately corrected at this time.

In the example shown in FIG. 7, the hand in the hand image is shown in a position to operate the graphic image F3. In this case, the user is able to know that the function of the switch corresponding to the graphic image F3, i.e., an E-mail function, would be realized if he were to operate the switch with his hand in the current position. In this way, even if the user does not look directly at the operating portion 20, he is able to operate a desired operating switch of the operating portion 20 while viewing the display portion 40. Accordingly, when the user is the driver, he can operate the switch with the operating portion 20 which is within easy reach while looking at the display portion 40 which is in his forward field of view without greatly changing his driving posture or line of sight (a so-called blind touch operation), thereby enabling a switch operation to be performed safely without impeding driving. To operate the touch panel, people typically tend to position the fingertip on the operating switch relying on the position of the tip end portion of the finger instead of the flat portion of the finger that is detected by a sensor. The camera is therefore preferably arranged to capture the operating portion 20 from the front of the operating portion 20 at an angle, as shown in FIG. 2. For example, the optical axis of the camera 50 is set at an angle that is inclined approximately 20 degrees with respect to the generally flat operating surface of the operating portion 20. As a result, the tip end portion of the finger is included in the hand image of the combined image, thus improving operability.

Here, the hand image extracted from the camera image is preferably combined after being converted to a graphic image which shows the hand either abstractly or artificially, as shown in FIGS. 7A, 7B, 7C, and 7D, in order to avoid the user feeling a physiologically strange sensation (i.e., a creepy or yucky feeling) as he may if an image of the user's own hand were to directly appear.

The graphic image of the hand is generated based on an outline of the hand in the hand image that is extracted from the camera image. Not using the region inside of the outline of the hand in this way makes it possible to provide a stable hand image that is not easily affected by ambient light which differs between day and night, as well as makes it possible to avoid the user from feeling a physiologically strange sensation that he may otherwise feel if a large portion of his hand were displayed in a real fashion, as described above.

Figure 7A:
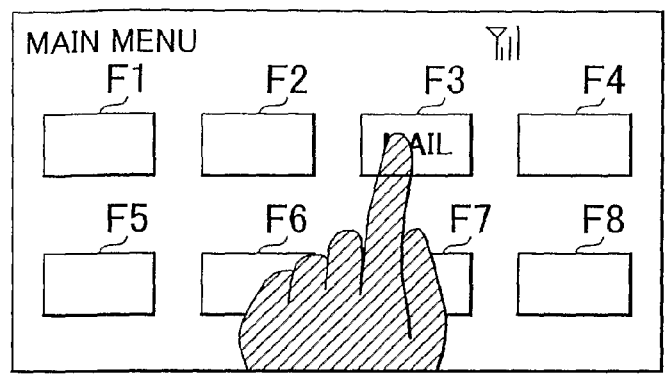
FIG. 7A to FIG. 7D are views of a plurality of examples of combined images.
Figure 7B:
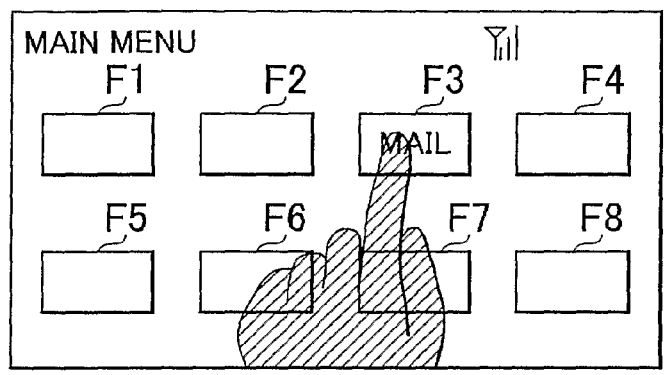
Figure 7C:
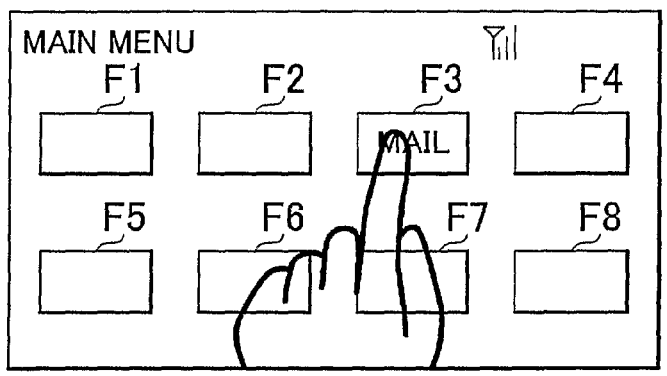
Figure 7D:
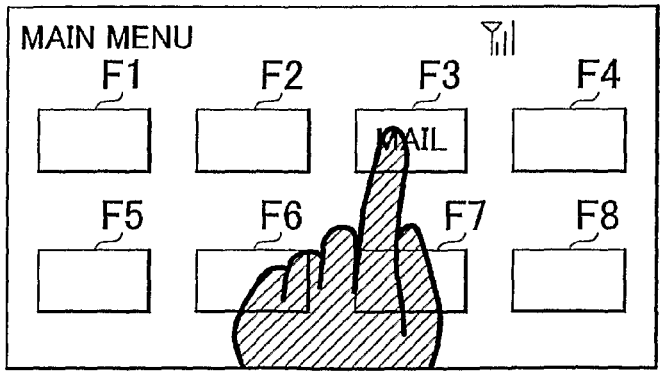

The graphic image of the hand may be generated in one of several ways. For example, as shown in FIG. 7A, the region inside the outline may be removed and that region colored a predetermined color (a non-transparent color) such that a silhouette of the hand appears on the display portion 40. Alternatively, as shown in FIG. 7B, a semi-transparent color may be applied to the region inside the outline. In this case, a portion of the operation menu image that is being hidden behind the hand may be shown to the user while being semi-transparent. Or, as shown in FIG. 7C, only the outline of the hand may be displayed. In this case as well, the user may be shown the portion of the operation menu image that is being hidden behind the hand. In order to enable the user to quickly recognize the position of the hand, the outline may be displayed in such a manner that it is emphasized by a relatively thick line or strong luminance, as shown in FIG. 7C. Alternatively, as shown by FIG. 7D, a graphic image may be generated by combining FIGS. 7B and 7C. That is, the outline may be emphasized while a semi-transparent color is applied to the region inside the outline. As a result, the portion being hidden behind the hand can be shown to the user while being semi-transparent. Also, the position of the hand can be quickly recognized by the emphasized outline. The various graphic images described above are generated by the hand image combining circuit 72. The structure may also be such that the user is able to select and/or change which of the foregoing various graphic images is generated at that time.

Also, the graphic image of the hand is preferably produced so that the hand in the graphic image appears smaller than it actually is. That is, the graphic image of the hand is preferably produced so that the region of the hand surrounded by the outline of the hand in the graphic image is smaller than the same region that is surrounded by the outline of the hand in the hand image that is extracted from the camera image.

Figure 8:
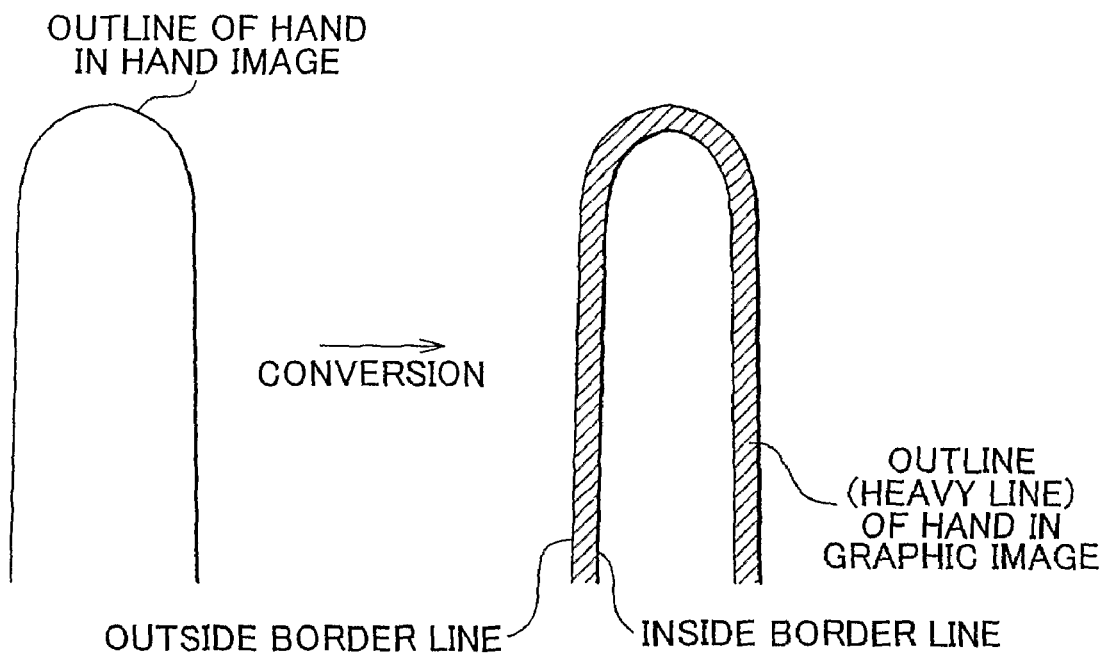
FIG. 8 is a view of an example of a preferred generated outline of a hand in a graphic image of a hand.

This may be achieved, for example, by generating the outline of the hand in the graphic image with a heavy line, making the outline of the hand in the hand image that is extracted from the camera image the outside border, and thickening the heavy line to the inside, as shown in FIG. 8. That is, the outside border line of the outline (the heavy line) of the hand in the graphic image may be made to match the outline of the hand in the hand image that is extracted from the camera image (i.e., the outline of the hand after it has been enlarged or reduced to match the operation menu image). Accordingly, the region of the hand surrounded by the outline of the hand in the graphic image (i.e., the region surrounded by the inside border line of the outline) can be made to appear smaller by an amount corresponding to the thickness of the heavy line without changing the size of the contour of the hand in the graphic image (i.e., the outside position of the heavy line). As a result, the strange sensation that may be felt by the user due to the hand appearing larger than it actually is can be reduced. In addition, the portion of the hand in the image that is effective for performing an actual operation corresponds to the inside of the hand (such as the flat portion of a finger), which makes it easier to accurately point to a given operating switch and thereby improves operability.

Alternatively, the contour itself of the hand in the graphic image may also be made smaller than the contour of the hand in the hand image extracted from the camera image by setting the outside border line of the outline (i.e., the heavy line) of the hand in the graphic image farther to the inside than the outline of the hand in the hand image extracted from the camera image. In this case, the contour of the graphic image becomes smaller so the portion hidden behind the hand in the graphic image becomes smaller, thereby improving visibility. The graphic image of the hand in which the contour has been reduced in size may be generated using the hand image combining circuit 72 to appropriately adjust the scale factor of the camera image or the hand image that is extracted from that camera image. However, not only can the entire hand be similarly reduced, it is also possible to reduce the size of only a portion of the hand (i.e., only the fingers) instead of similarly reducing the entire hand.

As described above, the operating portion 20 is not directly visible by the user during operation, which obviates the need to apply a graphic display showing the position and function and the like of the operation switch as shown in FIG. 4 to the operating portion 20. Rather, the operating portion 20 needs to have a structure that makes it easy to extract the hand image. That is, as described above, the hand image is extracted by relying on the contrast difference or color difference between it and the image of portions other than the hand (i.e., the image of the operating portion 20) in the camera image (see FIG. 5). Therefore, an operating portion 20 which can provide luminance or color in the image to increase the contrast difference or color difference is useful.

As is indicated in the "Description of the Related Art" above, however, the operating portion 20 is exposed to an environment in which sunlight inevitably shines on it due to the fact that it is mounted in a vehicle. When sunlight shines on the operating portion 20, is causes the color (saturation) and brightness of the operating portion 20 in the image to change and results in shadows of objects (including the shadow of the hand) appearing on the operating portion 20. As a result, the contrast difference or the color (saturation) difference between hand image and the image of the background which is the portion other than the hand in the image (i.e., the image of the operating portion) tend to decrease, making it difficult or impossible to accurately extract the hand image from the camera image and possibly resulting in an image of an object other than the hand being combined.

Thus, the characteristic structure provided in this example embodiment is light emitting means 24 for illuminating the operating portion 20. Hereinafter, the structure of the operating portion 20 including the light emitting means 24 will be described in detail with reference to FIG. 6.

Figure 6:
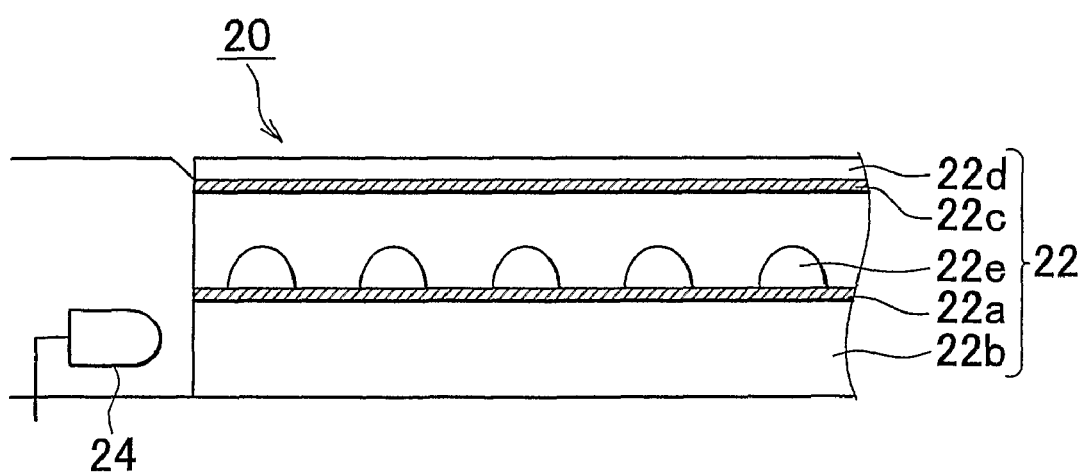
FIG. 6 is a sectional view showing a main portion of an operating portion.

FIG. 6 is a sectional view showing a main portion of the operating portion 20. The operating portion 20 has a transparent touch panel 22. The transparent touch panel 22 may have a typical structure. For example, the transparent touch panel 22 has a layered structure. In the layered structured, an acrylic substrate 22b (or glass substrate or the like) is provided at the bottom, and a film substrate 22d is provided on top. A thin film transparent electrode 22a is provided on the acrylic substrate 22b. A thin film transparent electrode 22c is provided under the film substrate 22d. The thin film transparent electrodes 22a and 22c face one another across dot spacers 22e. An operating signal (operating position signal) on the transparent touch panel 22 is supplied to the display control unit 70 (see FIG. 3) via a FPC (Flexible Printed Circuit), not shown, which is connected to a side portion of the transparent touch panel 22. The display control unit 70 controls various on-board equipment to realize functions (including switching the operation menu image of the display portion 40 described above) in response to the operating signal (operating position signal) on the transparent touch panel 22.

The light emitting means 24 is set on the side portion of the transparent touch panel 22. The light emitting means 24 is a light source such as an LED which is arranged to shine light from the side portion onto the acrylic substrate 22*b* which is the bottom layer of the transparent touch panel 22. The light emitting means 24 illuminates the entire transparent touch panel 22 (i.e., the entire operating portion 20) from the side portion of the transparent touch panel 22 under the control of a light emitting control portion 74 (see FIG. 3) described in detail below. The light emitted by the light emitting means 24 diffuses to substantially evenly illuminate the entire region of the transparent touch panel 22 by an acrylic light guide plate. Alternatively, the light emitting means 24 may illuminate the entire transparent touch panel 22 (i.e., the entire operating panel 20) from behind the transparent touch panel 22. Similarly, light emitted by the light emitting means 24 diffuses appropriately to illuminate, with substantially even luminosity, the entire operating portion 20, i.e., so that light passes through the transparent touch panel 22 evenly across the entire operating region of the transparent touch panel 22. This light emitting means 24 may have a structure similar to that of a backlight of a liquid crystal display (e.g., a light guide plate type backlight provided with an acrylic light guide plate, a lamp, a lamp reflector plate, and the like).

Also, using a light source having a specific wavelength, a filter may be provided which enables the wavelength of the light source to pass through to the camera 50. In this case, the camera responds only to the wavelength of the light source and so is not easily affected by sunlight. Furthermore, light of a wavelength not included in sunlight may be used for the light source. As a result, the camera 50 captures images using light in a wavelength band not included in sunlight. Therefore, even if sunlight enters the operating portion 20, it is possible to both prevent that sunlight from changing the color (saturation) or brightness of the operating portion 20 in the image, as well as prevent the shadow of an object from being combined in the image.

According to this example embodiment, the operating portion 20 itself is illuminated by the light emitting means 24 so even if sunlight enters the operating portion 20, it is possible to counteract that sunlight, which make it possible to avoid problems such as the color (saturation) or brightness of the operating portion 20 in the image changing due to the sunlight and shadows of objects being cast on the operating portion 20. Accordingly, the luminance or color of the image of the operating portion 20 is stable because it is not affected by sunlight. Therefore, even if sunlight suddenly enters the operating portion 20 due to, for example, a change in the positional relationship between nearby buildings and the vehicle while the vehicle is running, the hand image can still be accurately extracted from the camera image so in this case as well, the desired combined image can be stably generated. Also, according to the invention, the color difference and the like necessary to accurately extract the hand image is maintained at a high level without being affected by sunlight, as described above, which also obviates the need for the camera 50 to be a high resolution camera which is expensive.

Further, according to this example embodiment, the operating portion 20 is illuminated so even in an environment in which there is insufficient lighting such as at night, there is no need to illuminate the operating portion 20 with interior cabin lighting or the like. In addition, only the operating portion 20 which is in easy reach is illuminated, thus preventing the driver from being bothered as he might by the cabin interior lighting.

Also in this example embodiment, when chroma key combining technology is used in the hand image combining circuit 72, the light emitting means 24 illuminates the operating portion 20 in a key color. As a result, the difference in color between the hand and portions other than the hand is large and stable so a desired combined image can be generated that is stable because it is not affected by sunlight or the like. The light which is emitted onto the operating portion 20 in this key color may be realized by, for example, coloring the acrylic light guide plate in the key color (e.g., painting the back surface of the transparent touch panel 22 with a blue fluorescent agent), using a color filter, or using a light source of the key color (such as a blue LED when the key color is blue).

Also, the structure may also be such that the user can select the key color using a color filter or a light source of a plurality of colors.

The ON/OFF state and the emitted luminance and the like of the light emitting means 24 is controlled by the light emitting control portion 74 (see FIG. 3). The light emitting control portion 74 may adjust the emitted luminance (i.e., strength) of the light emitting means according to the time, such as day or night, (or weather information). In this case, during the day when sunlight is the strongest, the light emitting means 24 may emit light at a relatively large luminance and at night when sunlight is weak, the light emitting means 24 may emit light at a relatively low luminance, and in the morning and evening may emit light at a medium luminance. Alternatively, the light emitting means 24 may adjust the luminance of the light emitted using the amount of sunlight (obtained by a sunlight sensor, for example) or the amount of outside light or the like as a parameter. As a result, it is possible to generate a high quality combined image that is stable because it is unaffected by sunlight or the like, as described above. In addition, the operating portion 20 is not illuminated with strong light when the lighting is poor such as at night so light can be emitted which will both save energy and not disturb the driver, also as described above.

The light emitting control portion 74 controls the light emitting means 24 to emit light preferably when the hand of the user is detected near or touching the operating portion 20. Normally, i.e., when the hand of the user is not detected near or touching the operating portion 20, the light emitting means 24 may either emit a reduced amount of light in which case the emitted luminance is low, or be turned off in which case the emitted luminance is zero. When light starts to be emitted, the light emitting means 24 is preferably controlled to gradually increase the emitted luminance up to a target luminance (either a fixed value or a variable value) (i.e., fade in), which gives a sense of warmth or luxury. When the hand of the user is no longer detected near or touching the operating portion 20 or when the operating portion 20 has not been operated for a predetermined period of time or longer, the light emitting means 24 returns to its original off or reduced lighting state. At this time, the light emitting means 24 is similarly preferably controlled so that the emitted luminance is gradually reduced (i.e., fade out), which also gives a sense of luxury or warmth. Fading in and out of the light emitted by the light emitting means 24 can easily be realized by performing duty control on the voltage (current) supplied to the light emitting means 24.

Similarly, when a hand of the user is detected near or touching the operating portion 20, the hand image combining circuit 72 also becomes operable (i.e., generates and outputs a combined image based on the camera image). That is, the light emitting means 24 and the hand image combining circuit 72 are both controlled ON and OFF in response to a proximity/contact detection signal from proximity/contact detecting means 30, which saves energy and makes it possible to prevent an image of an object other than a hand from being erroneously combined when that object is captured by the camera 50.

The proximity or touching of the hand to the operating portion 20 is preferably detected by the proximity/contact detecting means 30 (see FIGS. 1, 3, 13, and 14) provided near the operating portion. The proximity/contact detecting means 30 may be structured to detect according to any one of various methods such as contact current, capacitance, infrared measuring, or the like, similar to the detection mode of the operating portion 20. The proximity/contact detecting means 30 is preferably provided at a portion near the operating portion where the hand is placed when operating the operating portion 20 (i.e., a portion that supports an area around the wrist of the operating hand), that is, at a portion in front of the operating portion 20. In this case, the light emitting means 24 and the hand image combining circuit 72 only becomes active when the user places his hand on the portion near the operating portion. Setting the proximity/contact detecting means 30 in an area where the user naturally places his hand during an operation in this way enables the user to easily learn a suitable operating method, while also preventing unnecessary operation of the hand image combining circuit 72 and the like without losing operability. In FIG. 1, reference numeral 30 shows the detection area of the proximity/contact detecting means with a dotted line. In actuality, however, the proximity/contact detecting means 30 may also be fit beneath the surface layer of the center console so that it does not diminish the design (see FIG. 13).

Figure 9:
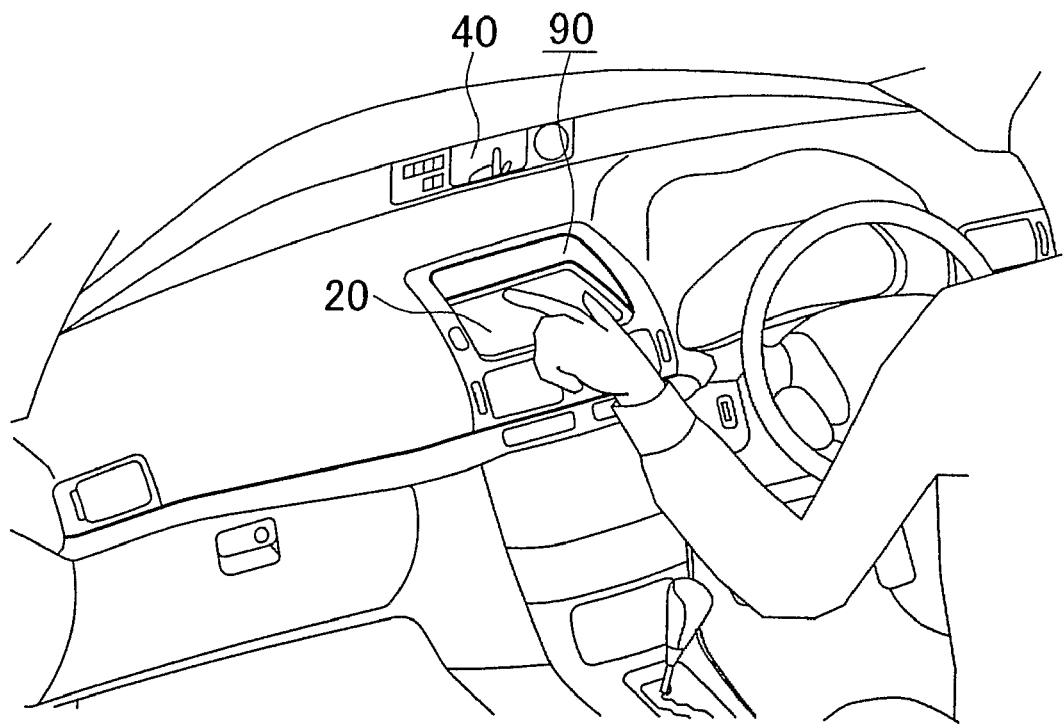
FIG. 9 is a perspective view of an in-vehicle arrangement of a vehicular operating apparatus according to a second example embodiment of the invention.
Figure 10:
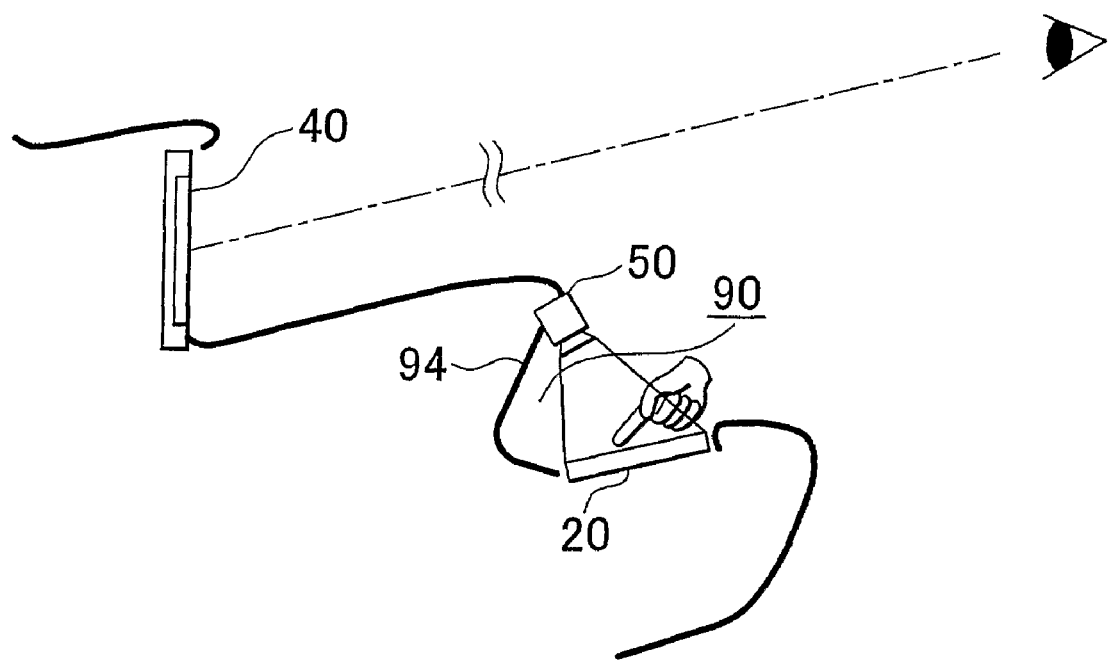
FIG. 10 is a sectional view schematically showing the vehicular operating apparatus shown in FIG. 9 as it appears from the side.

FIG. 9 is a perspective view of an in-vehicle arrangement of a vehicular operating apparatus according to a second example embodiment of the invention, and FIG. 10 is a sectional view schematically showing the vehicular operating apparatus shown in FIG. 9 as it appears from the side. The second example embodiment differs from the first example embodiment mainly with respect to the arrangement of the operating portion 20 and the camera 50. In the following description, structural elements that are the same as those in the first example embodiment will be denoted by the same reference numerals and descriptions of those structural elements will be omitted.

In this example embodiment, the operating portion 20 is arranged in a concave space or depression (hereinafter referred to as "concave space 90") formed in an instrument panel, as shown in FIGS. 9 and 10. The opening to this concave space 90 is of an appropriate size that enables the user to insert his hand into it and operate the operating portion 20. Accordingly, the user is able to locate the operating portion 20 by searching with his hand relying on the concave portion of the concave space 90, and thus operate the operating portion 20.

Also in this example embodiment, the operating portion 20 is arranged in the concave portion 90, as described above, so left and right side wall portions 92 defining the concave portion of the concave space 90 when viewed from above, together with the upper side of an eave portion 94 that defines the concave portion of the concave space 90 when viewed from the side, shield (i.e., blocking) the operating portion 20 from sunlight. This shielding means (i.e., the side wall portions 92 and the eave portion 94) reduces the amount of sunlight that enters the operating portion 20, thus enabling the same camera image that is not affected by sunlight, as described above, to be even more stably obtained. From this viewpoint, the operating portion 20 is preferably entirely housed within the concave space 90 to the extent to which operability is not lost, though a portion of the operating portion 20 may also protrude from the concave space 90 (see FIG. 13).

In the example shown in FIGS. 9 and 10, the concave space 90 is integrally formed with the instrument panel by forming the concave portion in the instrument panel. Alternatively, however, the concave portion 90 may also be defined by a covered operating unit (see FIG. 13), to be described later, which can be attached to the instrument panel. In either case, part of the side wall portion 92 and/or the eave portion 94 which define the concave space 90 may protrude farther toward the side where the driver is seated (i.e., toward the rear of the vehicle) than the portion around the instrument panel. This enables the user (particularly the driver) to locate the operating portion 20 by searching with his hand, relying on the concave portion of the concave space 90 and the protruding portion around that concave portion.

Further, the camera 50 is arranged in the concave space 90 opposite the operating portion 20, as shown in FIGS. 9 and 10. That is, the camera 50 is arranged facing downward on the eave portion 94 that defines the concave space 90. As a result, sunlight is prevented from directly entering the lens of the camera 50 and as well as from entering the lens of the camera 50 by being reflected by the operating portion 20, thus enabling halation to be prevented.

FIG. 11 is a perspective view of a vehicular operating apparatus according to another example embodiment. In this example embodiment, the operating portion 20 is arranged in the concave space 90 formed in the center console portion. More specifically, the side wall portions 92 and the eave portion 94 are formed upright on the center console portion such that the concave space 90 is formed surrounded by those portions with the operating portion 20 arranged inside it. As a result, the amount of sunlight that enters the operating portion 20 is reduced, similarly enabling the same camera image that is not affected by sunlight to be even more stably obtained, as described above. In the example shown in FIG. 11, the concave space 90 is defined by the side wall portions 92 and the eave portion 94 that are integrally formed with the center console portion. Alternatively, however, the concave portion 90 may also be defined by a covered operating unit (see FIG. 13), to be described later, which can be attached to the instrument panel. In either case, part of the side wall portion 92 and/or the eave portion 94 which define the concave space 90 may protrude farther toward the side where the driver is seated (i.e., higher) than the portion around the center console portion. This enables the user (particularly the driver) to locate the operating portion 20 by searching with his hand, relying on the protruding portion.

In the example embodiment illustrated in FIG. 11 as well, the camera 50 may be arranged in the concave space 90 opposite the operating portion 20, as shown in FIG. 10. As a result, sunlight is prevented from directly entering the lens of the camera 50 and as well as from entering the lens of the camera 50 by being reflected by the operating portion 20, thus enabling halation to be prevented.

Figure 12:
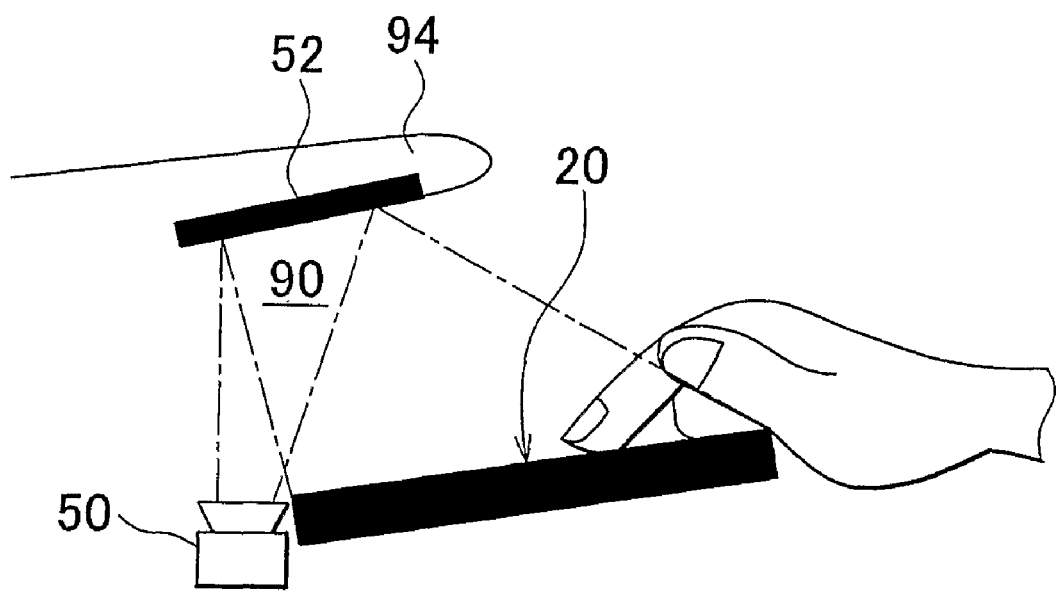
FIG. 12 is a view illustrating another method of arrangement of a camera in a concave space.

FIG. 12 is view illustrating another method of arrangement of the camera 50 in the concave space 90 schematically shown in the sectional view from the side.

In the example shown in FIG. 12, the camera 50 is arranged near the operating portion 20 in the concave space 90 (on the far side of the operating portion 20 in this example embodiment), and a mirror 52 is arranged on the eave portion 94 opposite the operating portion 20. This mirror 52 is an all reflective type flat mirror or slightly convex mirror. In this case, the camera 50 and the mirror 52 are arranged in a relationship in which the camera 50 is able to look down on the operating portion 20 (and the user's hand that is operating the operating portion 20) via the mirror 52. As a result, the necessary light path can be ensured even in the restricted concave space 90. That is, the mirror 52 is arranged midway in the light path from the camera 50 to the operating portion 20 so when the mirror 52 is a flat mirror arranged substantially near the center of the light path, for example, the necessary distance on each side between the operating portion 20 and the eave portion 94 in the concave space 90 when viewed from the side is substantially one-half that when the mirror 52 is not used.

Figure 13:
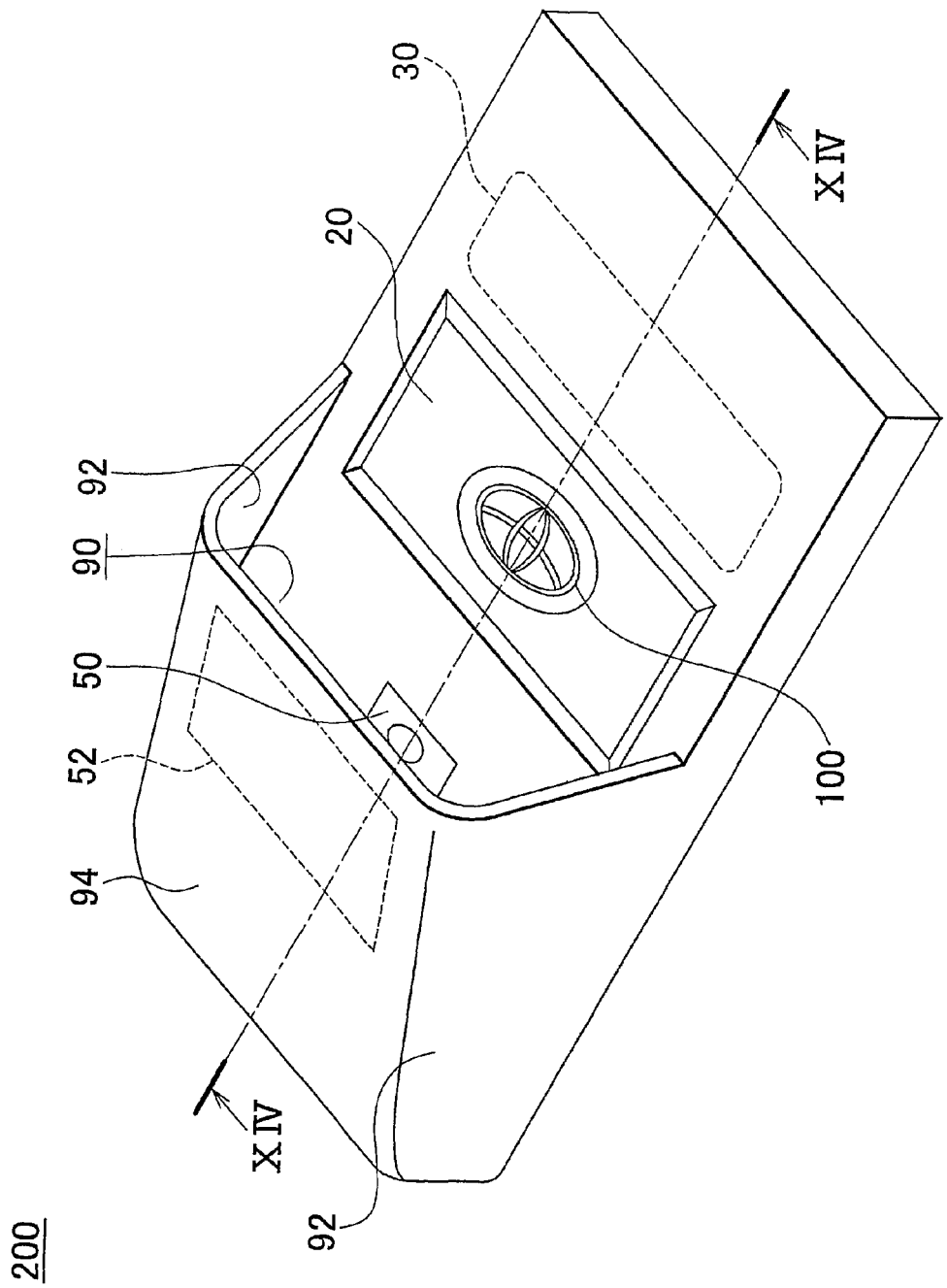
FIG. 13 is a perspective view of a covered operating unit.
Figure 14:
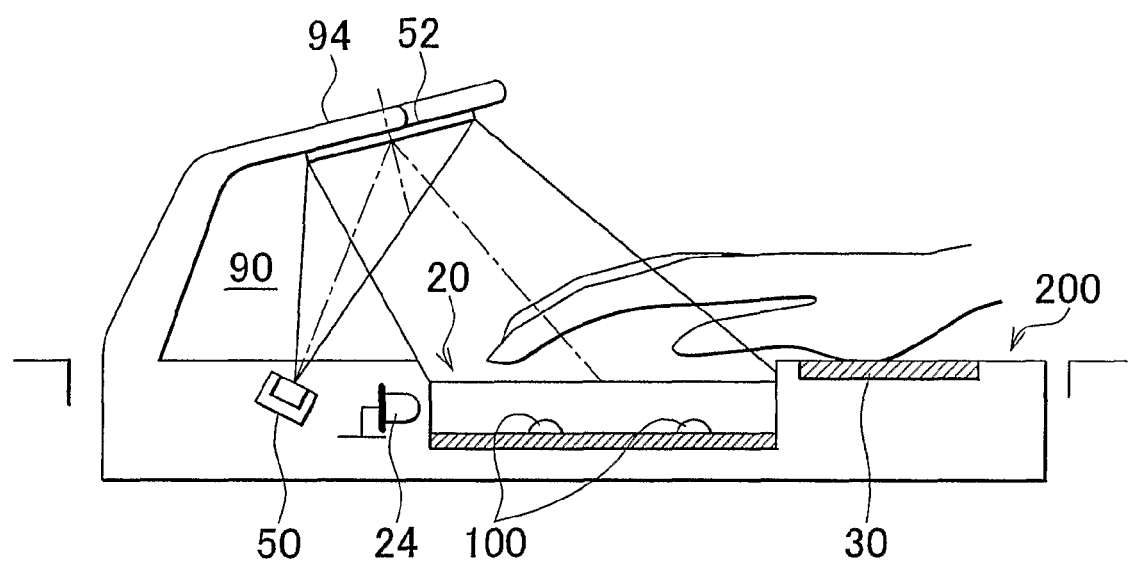
FIG. 14 is a sectional view of the covered operating unit shown in FIG. 13.

FIG. 13 is a perspective view of a covered operating unit, and FIG. 14 is a sectional view taken along line XIV-XIV in FIG. 13. In the example shown in FIG. 13, a covered operating unit 200 is structured so as to be incorporated into the center console portion. The covered operating unit 200 is an integrated unit provided with an operating portion 20, a camera 50, a mirror 52, and proximity/contact detecting means 30, as shown in FIG. 14. The cover operating unit 200 also has a concave space 90 like that described above, in which the operating portion 20 (i.e., a portion thereof), the camera 50, and the mirror 52 are arranged. The main structural elements of the vehicular operating apparatus can also be unified in this way. In this case, for example, they may easily be assembled to the center console portion and the positioning accuracy of the optical system of the camera 50 and mirror 52 with respect to the operating portion 20 becomes easy to control. In the example shown in FIG. 14, a decorative relief (engraving) 100 is added to the back surface of the acrylic substrate 22b in order to enhance the design.

While the invention has been described with reference to exemplary embodiments thereof, it is to be understood that the invention is not limited to the exemplary embodiments or constructions. To the contrary, various modifications and equivalent arrangements may be added to the foregoing example embodiments without departing from the spirit and scope of the invention.

For example, in the foregoing example embodiments, only a proximity or contact detection type operation switch is provided in the operating portion 20. Alternatively or in addition, however, a pushbutton type mechanical switch may be provided. For example, a mechanical switch may be provided in an escutcheon portion (i.e., a frame portion around the transparent touch panel 22) of the operating portion 20.

Also, in the foregoing example embodiment, the operation menu image is output to the display portion 40. Alternatively, however, another image or picture, such as various pictures from TV, or a DVD or the like that is playing, as well as map images from a navigation system, may also be displayed. In this case as well, a small operation menu image can also be displayed superimposed on a TV picture or the like. For example, a small operation menu image showing the positions of operating switches for changing the channel or volume may be displayed at the bottom of the screen over a TV picture, for example. In this case, the combined image that includes the image of the user's hand that is attempting to operate the TV channel switch, for example, is superimposed on the TV picture, which enables the user to change the channel or the like in the operating portion 20 while viewing the positional relationship between the hand in the hand image and the operation menu image in the same way as described above.

Also, in the foregoing example embodiment, operations can be performed with the operating portion 20 so the display of the display portion 40 does not have to be a touch panel type, although it may be.

Further, in the foregoing example embodiment, brightness that counteracts sunlight is necessary so the light emitting means 24 which emits light electrically is used. Alternatively, however, the operating portion 20 may be painted with a night paint which corresponds to the key color so that light emitted from the light emitting means 24 cannot be eliminated or its luminance reduced only at night. Also, the brightness may be supplemented by using excitation light from sunlight when sunlight enters using fluorescent acrylic material that corresponds to the key color.

The invention claimed is:

1. A vehicular operating apparatus comprising:
 a touch panel operating portion on which operating switches are arranged, which has an upper surface on which an operation is performed by a hand of a user, and which generates an operating signal that corresponds to an operating position;
 a display portion that is arranged in a vehicle cabin in a position physically distanced from the operating portion, and that displays an operation menu image showing the positional arrangement and function of the operating switches;
 an imaging portion that captures images of the operating portion and the hand of a user;
 a combining and displaying portion that combines the captured image of the hand with the operation menu image and displays the combined image on the display portion; and
 a light emitting portion provided in the operating portion that illuminates the entire operating portion to which a display concerning the operating switches is not applied,
 wherein the combining and displaying portion performs the combining and displaying by converting the image of the hand to a graphic image of the hand, combining the graphic image of the hand with the operation menu image and displaying the combined image on the display portion, and
 the graphic image of the hand is generated by displaying only an outline of the hand and applying a transparent or semi-transparent color to a region inside the outline of the hand.

2. The vehicular operating apparatus according to claim 1, wherein the combining and displaying portion uses chroma key combining technology, and the light emitting portion illuminates the operating portion in a key color.

3. The vehicular operating apparatus according to claim 1, wherein the light emitting portion adjusts luminance of emitted light with at least an amount of sunlight as a parameter.

4. The vehicular operating apparatus according to claim 1, further comprising:
 a shielding portion that blocks sunlight from shining onto the operating portion, provided around the operating portion.

5. The vehicular operating apparatus according to claim 1, wherein the operating portion is arranged within a concave space formed in an interior member of the vehicle.

6. The vehicular operating apparatus according to claim 5, wherein the imaging portion is arranged within the concave space.

7. The vehicular operating apparatus according to claim 5, further comprising:
 a mirror arranged in the concave space so as to oppose the operating portion, wherein the imaging portion is arranged in a position looking down on the operating portion via the mirror.

8. The vehicular operating apparatus according to claim 1, wherein the combining and displaying portion performs the combining and displaying by converting the image of the hand to a graphic image of a hand, combining the graphic image of the hand with the operation menu image and displaying the combined image on the display portion.

9. The vehicular operating apparatus according to claim 1, wherein an outline of the hand in the graphic image of the hand is generated based on a silhouette of the hand that is extracted based on the image of the hand, and the region of the hand that is surrounded by the outline is smaller than the same region that is surrounded by the silhouette of the extracted hand.

10. The vehicular operating apparatus according to claim 1, wherein the combining and displaying portion becomes operable when the hand of the user is detected near or touching the operating portion.

11. The vehicular operating apparatus according to claim 10, further comprising:
a proximity/contact detecting portion that detects proximity of or contact by the hand of the user, the proximity/contact detecting portion being provided in an area near the operating portion.

12. The vehicular operating apparatus according to claim 1, wherein the light emitting portion illuminates the operating portion while gradually increasing luminance of emitted light when the hand of the user is detected near or touching the operating portion.

13. The vehicular operating apparatus according to claim 12, wherein when the hand of the user is not detected near or touching the operating portion, or when the operating portion is not operated for a predetermined period of time or longer, the light emitting portion returns to an original off state or reduced light state while gradually reducing luminance of emitted light.

14. The vehicular operating apparatus according to claim 12, further comprising:
a proximity/contact detecting portion that detects proximity of or contact by the hand of the user, the proximity/contact detecting portion being provided in an area near the operating portion.

15. The vehicular operating apparatus according to claim 1, wherein the light emitting portion includes a light source that emits light that includes a specific wavelength, and the imaging portion includes a filter through which the wavelength of the light source passes.

16. The vehicular operating apparatus according to claim 15, wherein the light source emits light of a wavelength not included in sunlight.

17. The vehicular operating apparatus according to claim 1, further comprising:
a diffusion member provided on the operating portion,
wherein the diffusion member diffuses light emitted by the light emitting portion substantially evenly over an entire operating portion.

* * * * *